United States Patent [19]

Terwilliger

[11] 4,364,366
[45] Dec. 21, 1982

[54] INDUCTION SYSTEM FOR SUPERCHARGED ENGINE

[75] Inventor: Gerald L. Terwilliger, Wixom, Mich.

[73] Assignee: Eaton Corporation, Cleveland, Ohio

[21] Appl. No.: 214,301

[22] Filed: Dec. 8, 1980

[51] Int. Cl.³ ............................................. F02B 33/44
[52] U.S. Cl. .................................. 123/564; 123/559; 60/611; 60/613
[58] Field of Search .................. 123/564, 559; 60/600, 60/611, 601, 13

[56] References Cited

U.S. PATENT DOCUMENTS

| | | | |
|---|---|---|---|
| 2,383,198 | 8/1945 | Jorgensen | 123/564 |
| 2,559,859 | 7/1951 | Elliot et al. | 123/559 |
| 2,578,028 | 12/1951 | Udale | 60/601 |
| 2,608,051 | 8/1952 | Nettel | 60/601 |
| 2,773,348 | 12/1956 | Grieshaber et al. | 60/611 |
| 3,324,651 | 6/1967 | Smith et al. | 60/13 |
| 3,868,822 | 3/1975 | Keller | 60/611 |
| 4,062,333 | 12/1977 | Matsuda et al. | 123/564 |
| 4,104,882 | 8/1978 | Gillbrand et al. | 123/559 |

FOREIGN PATENT DOCUMENTS 197804  4/1978  Fed. Rep. of Germany ........ 60/611

OTHER PUBLICATIONS

SAE Article, vol. 89, No. 4, by Jack Yamaguchi—pp. 85-87.

Primary Examiner—Raymond A. Nelli
Attorney, Agent, or Firm—C. H. Grace; F. M. Sajovec

[57] ABSTRACT

Disclosed is an induction or supercharger system (16) for a piston engine (10) having a Roots type blower (14) for supercharging an air-fuel mixture from a carburetor (12) having primary and secondary throttle valves (60, 62). The induction system includes four ducts (50, 52, 54, 56) which converge at an end into a central area or valve chamber (58) having a butterfly valving member (68) disposed therein. The other end (50a, 52a, 54a, 56a) of the ducts communicate respectively with the carburetor, the supercharger inlet, the supercharger outlet, and the engine combustion chambers. The valves (60, 62, 68) are moved by a linkage mechanism (44) between positions respectively controlling air flow through the carburetor and through the four ducts to the engine. The linkage mechanism includes a lever (72) and linkage assemblies (74, 76) connected between the lever and the valves (60, 62) and (68) respectively. The linkage assemblies include springs (88, 102) which respectively move the throttle valves open and the butterfly valving member closed.

13 Claims, 4 Drawing Figures

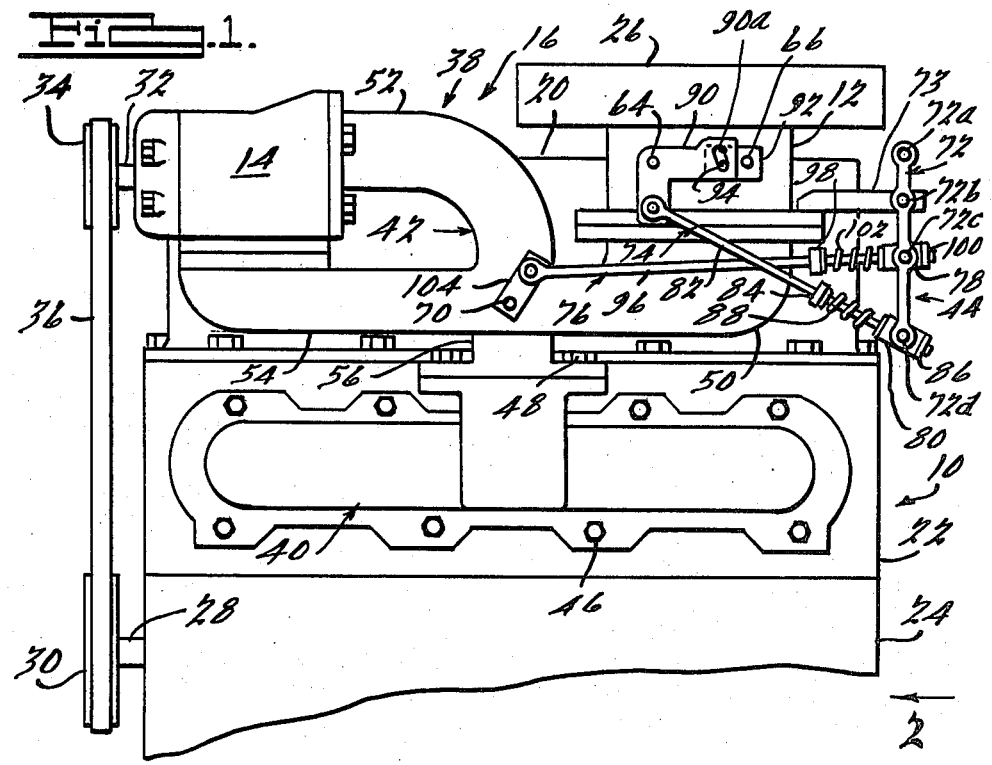
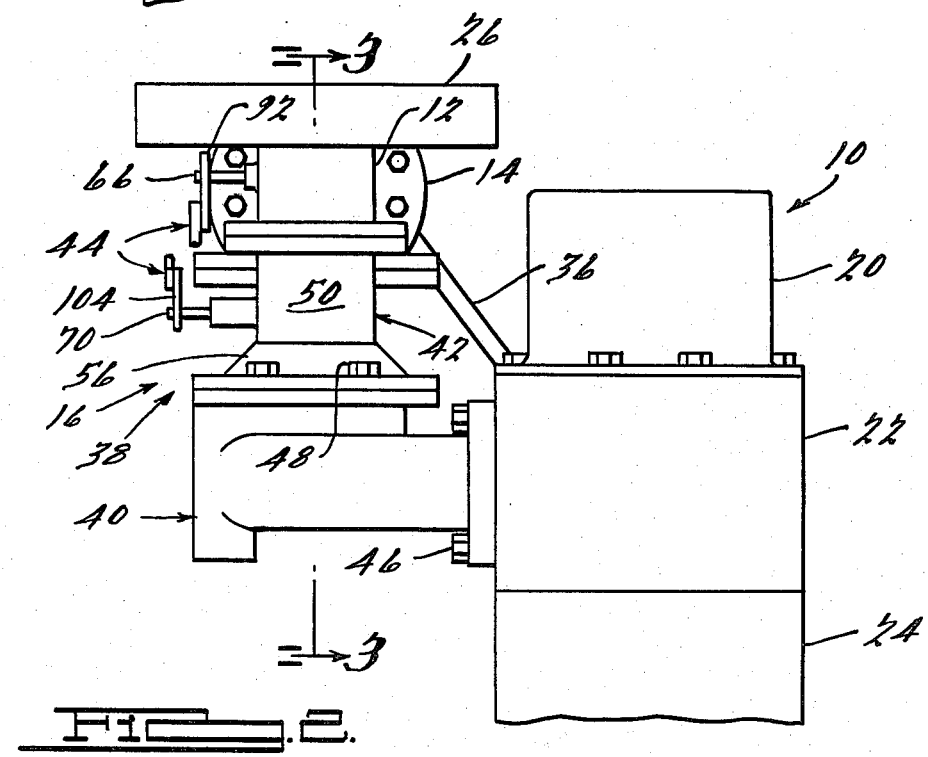

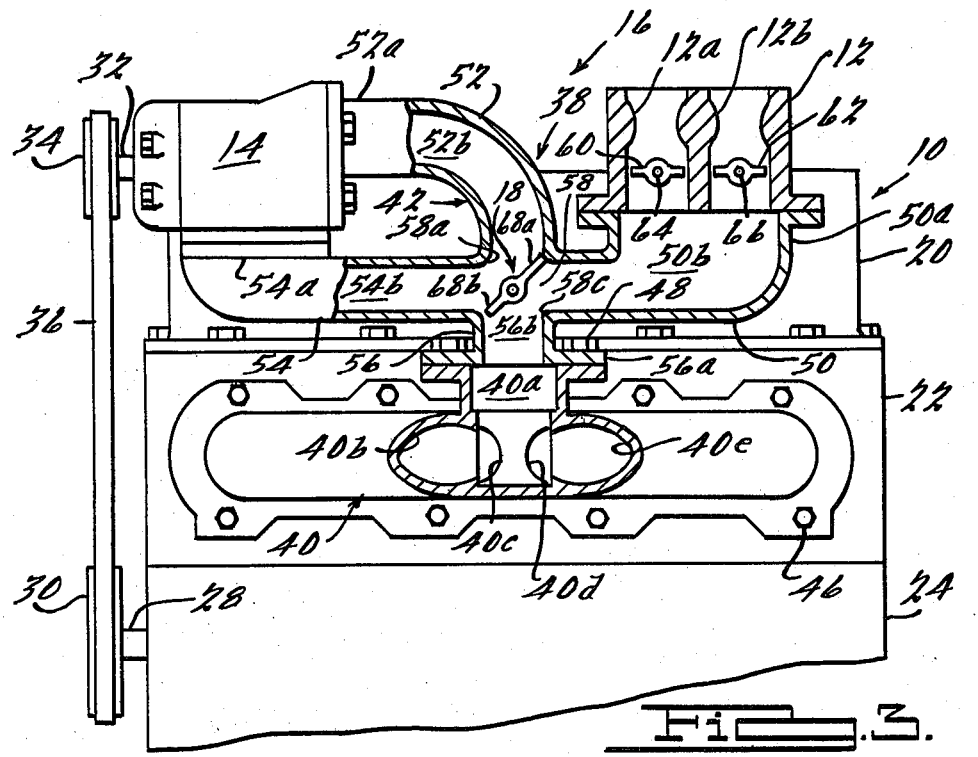
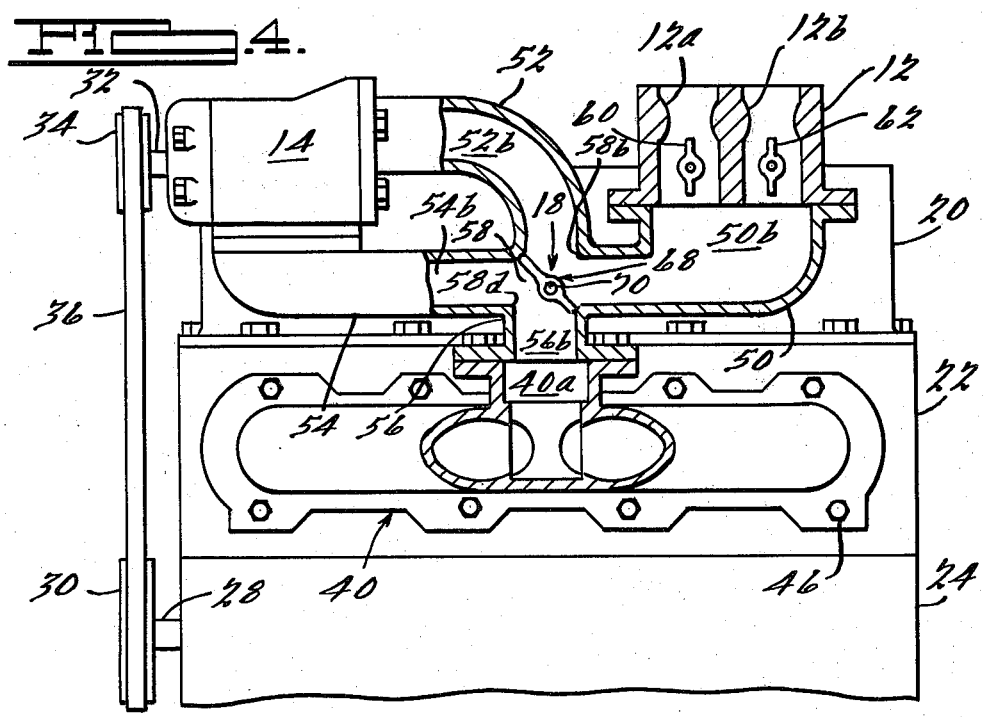

INDUCTION SYSTEM FOR SUPERCHARGED ENGINE

CROSS-REFERENCE TO RELATED APPLICATIONS

This application is related to U.S. Pat. application Ser. No. 214,304, filed Dec. 8, 1980; U.S. patent application Ser. No. 214,358, filed Dec. 8, 1980; and to U.S. patent application Ser. No. 214,305, filed Dec. 8, 1980. Both applications are assigned to the assignee of this application.

FIELD OF THE INVENTION

This application relates to supercharger systems and more specifically to supercharger systems which are selectively operable to deliver naturally aspirated air and supercharged air.

BACKGROUND OF THE INVENTION

During the last several years increasing cost and reduced availability of fuel has motivated many automobile manufacturers to produce more fuel efficient vehicles by not only reducing vehicle weight but by also reducing engine size or power relative to vehicle weight, thereby depriving motorists of accustomed vehicle performance, such as power for acceleration, hill-climbing, etc. To regain this performance and still retain fuel efficiency many automotive manufacturers have offered or considered offering vehicles with supercharger systems having displacement or turbodynamic blowers which are either mechanically driven by the engine crankshaft or turbine driven by the engine exhaust gases. Such systems though well-known have not met with great customer acceptance even though they had been satisfactorily used for years to maintain aircraft engine power with increasing altitude and to increase racing car speeds. Most of the automobile superchargers have been of the turbine driven-turbodynamic blower type commonly referred to as turbochargers; a few have been of the mechanically driven displacement blower type, e.g., vane or Roots blowers driven by gear arrangements, V-belts, etc.

The turbochargers in automobiles have been disappointing for several reasons. They have been relatively inefficient when operated outside of their range of maximum efficiency, have had slow response, have required relatively complicated and expensive controls to prevent overboost and engine damage, and have required large hot ducts in the already cramped and overheated engine compartments to direct exhaust gases to and from the turbine. Of these, the most unacceptable is probably slow response in boosting engine power for accelerating the vehicle from zero or low speeds.

The supercharger systems with mechanically driven displacement type blowers in automobiles have also been disappointing for several reasons. When used to deliver air to the engine full time over the full operating range of the engine, they have also been relatively inefficient and have caused rough low-speed engine operation. When used in combination with a bypass duct to deliver naturally aspirated air to the engine at low engine speeds and/or low engine power settings to improve rough low-speed engine operation, they have also been relatively inefficient and have had either slow response, as with turbochargers, or have had an overly fast response which caused a stepwise increase in engine power and therefore objectionable jerky vehicle operation. Further, supercharger systems with displacement type blowers have been subject to catastrophic failure due to engine backfire unless provided with special blowout valves.

SUMMARY OF THE INVENTION

An object of this invention is to provide an efficient induction system for a supercharged engine.

Another object of this invention is to provide a supercharger induction system which is simple and readily controlled to direct either naturally aspirated air or supercharged air to the engine.

According to a feature of the invention an induction system includes first, second, third, and fourth ducts each converging at one end at a central area and adapted at their other ends respectively to communicate with a source of air, a supercharger inlet, a supercharger outlet, and an expansible combustion chamber of an engine; and valve means including a valving member disposed in the central area and moveable between first and second positions, the valving member is operative in the first position to communicate the first duct with fourth duct via a portion of the central area and the second duct with the third duct via another portion of the central area while substantially blocking intercommunication between the portions, and the valve is operative in the second position to communicate the first duct with the second duct via a portion of the central area and the third duct with the fourth ducts via another portion of the central area while blocking intercommunication between the portions.

BRIEF DESCRIPTION OF THE DRAWINGS

The supercharger system of the instant invention is shown in the accompanying drawings in which:

FIG. 1 is a side elevational view of the supercharger system mounted on a partially shown engine;

FIG. 2 is an end elevational view of the system looking in the direction of arrow 2 in FIG. 1; and FIGS. 3 and 4 are partial cross sectional views of the system looking along line 3—3 of FIG. 2.

Certain teminology referring to proposed environment, direction, and motion will be used in the following description. This terminology is for convenience and clarity in describing the invention and should not be considered limiting in the appended claims unless the claims are explicitly so limited.

DETAILED DESCRIPTION OF THE DRAWINGS

Looking first at FIGS. 1-4 in general, therein is disclosed a partially shown engine 10 equipped with a carburetor 12, a supercharger 14, and an induction or supercharger system 16. The induction system includes a valve 18 (see FIGS. 3 and 4) operative in a first position of FIG. 3 to direct the flow of an air-fuel mixture from the carburetor to the engine via a first or natural aspiration path and to direct discharge air from the supercharger outlet back to the supercharger inlet via a recirculation path. Valve 18 is operative in its second position of FIG. 4 to direct the flow of an air-fuel mixture from the carburetor to the engine via a second or supercharger path.

Carburetor 12 may be a single point fuel injector and is preferably disposed upstream of the supercharger as shown herein. However, carburetor 12 may be positioned downstream of the supercharger and may be deleted in lieu of multiple fuel injector nozzles which may inject fuel either into the manifold or directly into the expansible chambers of the engine. Further, engine 10 is preferably an Otto cycle engine of the type used in automotive and truck type vehicles. However, the engine may be of the diesel cycle type, in which case carburetor 12 would be replaced by fuel injection nozzles which inject fuel directly into the expansible chambers. Herein, engine 10 is a conventional four-cylinder, four-stroke, spark-ignited engine wherein each cylinder defines an expansible chamber having inlet and outlet ports controlled by poppet valves which are actuated by a camshaft driven by a crankshaft; none of these components are shown since they do not form a close part of the instant invention and since they are well-known. Portions of the engine, which are shown, include a valve cover 20, a head assembly 22, a block assembly 24, an air filter 26, and a crankshaft driven shaft 28 having a V-pulley 30 fixed thereto.

Supercharger 14, which may be a turbine driven variable or positive displacement blower, is preferably a mechanically driven positive displacement blower. Herein, the supercharger is a Roots type blower having two unshown rotors with three helical lobes each. The rotors are driven by a shaft 32 having a V-pulley 34 fixed thereto and mechanically connected to V-pulley 30 via a V-belt 36. Hence, the fluid, air, or air-fuel mixture displacement of the supercharger is always in direct proportion to engine speed.

Supercharger 14 is also preferably of the type which does not compress fluid being displaced by the blower until the fluid reaches the blower outlet, that is, the displaced fluid, be it air or an air-fuel mixture, is compressed only when the pressure in the region of the blower outlet is elevated. Roots blowers are of this type and are substantially more efficient when operating in a recirculation mode than blowers which compress fluid prior to displacement of the fluid at the blower outlet. For example, when valve 18 is open, the supercharger outlet is connected to the supercharger inlet via the recirculation path. Hence, when in the recirculation mode, the supercharger will only absorb the amount of energy necessary to circulate the fluid, since the supercharger inlet and outlet pressures are substantially the same. If the supercharger were of the type which compresses fluid prior to displace at its outlet, the supercharger would further absorb the energy necessary to compress the fluid, which energy would then be mostly wasted when the fluid is displaced into the recirculation path.

A Roots type blower is further preferred when induction system 16 is used with an Otto cycle engine since the adiabatic efficiency of such a blower is relatively high in the 1.0 to 1.5 pressure ratios normally used with Otto cycle engines in automobiles.

Looking now at induction system 16 in a more specific manner, the system includes an intake manifold assembly 38 divided into two duct assemblies 40 and 42 and a linkage mechanism 44. The linkage mechanism, which is fully described hereinafter, is fully shown in FIG. 1 and only partially shown in FIG. 2. Duct assembly 40 is fixed to engine 10 by a plurality of bolts 46 and duct assembly 42 is in turn fixed to assembly 40 by a plurality of bolts 48. Manifold assembly 38 is shown herein substantially as it is contemplated for a prototype supercharger system. It is contemplated that the assembly will be made substantially smaller and more compact in actual production to reduce the system bulk, passage length, and passage volume.

Looking now mainly at FIGS. 3 and 4, duct assembly 40 includes a chamber 40a and passages 40b, 40c, 40d, and 40e which extend diagonally from chamber 40a to the unshown poppet valve controlled inlets of the four expansible chambers in engine 10. Passages 40b and 40e are sectioned by line 3—3 and passages 40c and 40d are partially visible in the back wall of chamber 40a.

Duct assembly 42 includes four ducts 50, 52, 54 and 56 which converge at one end to define a valve body having a central area or valve chamber 58 forming part of valve 18. The valve body is schematically shown herein as being formed or constructed by the converging walls of the ducts. Such construction though clearly feasible is not essential, e.g., the valve body could be of separate construction and the ducts could merely converge or attach to ports in the valve body in a conventional manner.

The other ends 50a, 52a, 54a, 56a of the ducts are respectively attached to the carburetor base, the supercharger inlet, the supercharger outlet, and duct assembly 40 in any convenient manner; herein, bolted flanges are used. The ducts define passages 50b, 52b, 54b, 56b for respectively delivering air or an air-fuel mixture from an air source or carburetor 12 to central area 58, from the central area to the supercharger inlet, from the supercharger outlet to the central area, and from the central area to the expansible chambers of engine 10 via chamber 40a and diagonal passages 40b, 40c, 40d, and 40e.

Looking briefly at carburetor 12, passage 50b receives an air-fuel mixture from carburetor 12 by way of primary and secondary throats 12a and 12b which are controlled by primary and secondary throttle valves 60 and 62. Carburetor 12 and throttle valves 60 and 62 in particular form part of the engine power control means. The throats receive ambient air through filter 26 which is not shown in FIGS. 3 and 4. Fuel is mixed with the air in a conventional manner as the air passes through the throats. The amount of air passing through the throats is controlled by the throttle valves in conjunction with the rotational speed of the engine. The valves are respectively fixed to shafts 64 and 66 which are rotatably supported by the carburetor walls. One end of each shaft extends through a wall of the carburetor. Both shafts are visible in FIG. 1 and shaft 62 is visible in FIG. 2. The throttle valves 60 and 62 are respectively rotated clockwise and counterclockwise from their substantially closed position of FIG. 3 to their vertical or full open position of FIG. 4.

Valve 18 includes a butterfly valving member 68 disposed in central area 58 and fixed to a shaft 70 rotatably supported by the walls of the valve body. Valving member 68 is provided with unequal surface areas 68a and 68b on opposite sides of its pivotal axis and is moved from its first valve position of FIG. 3 to its second valve position of FIG. 4 in response to counterclockwise rotation of shaft 70. To facilitate rotation of the valving member between the first and second valve positions of FIGS. 3 and 4 respectively, one end of shaft 70 (see FIGS. 1 and 2) extends through one of the valve body walls. As is schematically shown in FIGS. 3 and 4, the valve body includes corners or valve seats 58a, 58b, 58c, and 58d which cooperate with valving member 68 to control the flow of the air-fuel mixture through the central area. When valving member 68 is in the first position of FIG. 3, the valving member contacts seat 58b and comes close enough to seat 58d to substantially block air-fuel mixture flow thereacross, thereby dividing the central area into two portions. One of the portions communicates passage 50b with passage 56b for defining an unsupercharged or natural aspiration flow path to the expansible chamber. The other portion communicates passage 54b with passage 52b for defining a recirculation path from the supercharger outlet back to the supercharger inlet. When valving member 68 is in the second position of FIG. 4, the valving member contacts seats 58a and 58c to block air-fuel mixture flow across the valve, thereby dividing the central area into two different portions. One of the portions communicates passage 50b with passage 52b and the other portion communicates passage 54b with passage 56b, thereby defining a supercharged flow path to the expansible chambers while blocking the natural aspiration flow path.

Looking now at linkage mechanism 44, as best seen in FIG. 1, the mechanism in conjunction with throttle valves 60 and 62 and the butterfly valving member of valve 18 forms the engine power control means. Mechanism 44 includes a pivotal lever 72 and linkage assemblies 74 and 76 for respectively controlling the throttle valves and the butterfly valving member. Lever 72 includes an opening 72a for attachment of a control device such as a rod or cable moved by an accelerator pedal of a vehicle, and opening 72b pivotally attached to a support 73 fixed to the base of carburetor 12, an opening 72c pivotally attached to a collar 78 of linkage assembly 76, and an opening 72d pivotally attached to a collar 80 of linkage assembly 74.

Linkage assembly 74 includes the collar 80 slidably mounted on a rod 82, stop rings 84 and 86 fixed to the rod, a helical compression spring 88 positioned between collar 80 and stop ring 84, an L-shaped bell crank 90 fixed to shaft 64 of the primary throttle valve 60 and pivotally attached to rod 82, and a lever 92 fixed to shaft 66 of the secondary throttle valve. Lever 92 is connected to bell crank 90 via a lost motion connection including a pin 94 fixed to lever 92 and projecting into an arcuate opening 90a defined by bell crank 90. Opening 90a has a radius of curvature centered on the axis of shaft 64.

Linkage assembly 76 includes the collar 78 slidably mounted on a rod 96, stop rings 98 and 100 fixed to the rod, a helical compression spring 102 positioned between collar 78 and stop ring 98, and a lever 104 fixed at one end to shaft 70 of the butterfly valving member and pivotally attached at the other end to rod 96.

OPERATION

Assume now that engine 10 is installed in a vehicle having an automatic transmission wherein about ninety percent of the accelerator pedal movement fully opens the carburetor throttle valves and the remainder of the accelerator pedal movement actuates an unshown mechanism which downshifts the transmission into a passing or lower speed ratio gear when the transmission is in high gear and the vehicle speed is less than some predetermined amount. Also assume that depression of the accelerator pedal applies a rightwardly directed force to attachment point 72a of lever 72 amd that an unshown spring applies a leftwardly directed force to attachment point 72a for returning lever 72 to its idle or minimum power position of FIGS. 1-3 when the accelerator pedal is released. As may be seen in FIG. 1, a rightwardly directed force applied to attachment point 72a rotates lever 72 clockwise about attachment point 72b and applies a leftwardly directed force to collars 78 and 80 of the linkage assemblies for resiliently moving bell crank 90 via spring 88 and rod 82 and for resiliently moving lever 104 via spring 102 and rod 96. Lever 72 and linkage assemblies 74 and 76, which are not drawn to exact scale, are arranged such that about fifty percent of full clockwise rotation of lever 72 from its minimum power position of FIG. 1 effects simultaneous opening and closing rotation, respectively, of primary throttle valve 60 and butterfly valving member 68 while secondary throttle valve 66 remains closed. This intermediate or fifty percent position of lever 72 rotates primary throttle valve 60 about seventy-five percent of its full travel from its substantially closed position of FIG. 3 to its full open or vertical position of FIG. 3. In this position throttle valve 60 is substantially full open since there is little increase in air flow through throat 12a solely in response to additional opening movement of the throttle valve. Movement of lever 72 to the intermediate or fifty percent position rotates butterfly valving member 68 of valve 18 to a position sufficiently close to its second position of FIG. 4 to effect a slight pressure difference across the valving member, i.e., the pressure in passages 54b and 56b becomes slightly greater than the pressure in passages 50b and 52b since the valving member in cooperation with seats 58a and 58c slightly restricts the flow of the naturally aspirated air-fuel mixture from passage 50b directly to passage 56b and slightly restricts the flow of recirculation air-fuel mixture in passage 54b to passage 52b. Hence, in about the fifty percent position of pivotal lever 72, engine 10 is still operating basically in the naturally aspirated mode, i.e., suction from the expansible chamber is still providing virtually all of the force for moving the air-fuel mixture through the induction system to the engine.

With lever 72 in about the fifty percent position spring 102 modulates the position of valving member 68 in combination with a feedback force provided by the difference in surface areas 68a and 68b to maintain the slight pressure difference relatively constant substantially independent of minor variations in engine speed. For example, if the engine load increases with lever 72 fixed at the fifty percent position, the engine speed will decrease and so will the amount of air-fuel mixture flowing in the induction system. Hence, the slight pressure difference across valving member 68 will tend to decrease, thereby decreasing the counter or feedback force to spring 102 due to the surface area difference of valving member 68 and thereby allowing the resilient force of spring 102 to move the valving member toward its second position of FIG. 4 enough to maintain the slight pressure difference relatively constant. If the engine load decreases with lever 72 again fixed at the fifty percent position, the engine speed will increase and so will the amount of air-fuel mixture flowing in the induction system. Hence, the slight pressure difference across valving member 68 will tend to increase, whereby the feedback force increases and moves the valving member towards its first position against the resilient force of spring 102 to maintain the slight pressure difference relatively constant. The difference in surface area of valving member 58 and the resilient force of spring 102 allows the engine to operate substantially in the naturally aspirated mode over a relatively large speed range when lever 72 is at or near its fifty percent position of full travel.

As previously mentioned, the first fifty percent movement of lever 72 rotates bell crank 90 clockwise. This amount of rotation takes up the lost motion provided by arcuate opening 90a. Continued clockwise rotation of bell crank 90, due to further rotation of lever 72, effects a counterclockwise rotation of secondary throttle valve 62, thereby moving the secondary throttle valve towards its full open position while simultaneously moving primary throttle valve 60 further toward its vertical or fully open position and while simultaneously rotating butterfly valving member 68 further toward its second position. At about the ninety percent position of lever 72 the primary and secondary throttle valves are fully open and the butterfly valving member 68 is in its second position seated against valve seats 58a and 58c. When in this position, lever 72 of the power control means is in the maximum power position. Further movement of lever 72 is absorbed by springs 88 and 102, thereby allowing the accelerator pedal to actuate the unshown transmission downshift mechanism.

During movement of lever 72 from the fifty percent position to the ninety percent position, the resilient forces applied by spring 102 progressively increase to move the butterfly valving member 68 to its fully closed position, thereby progressively blocking the naturally aspirated and recirculation paths and allowing the pressure of the air-fuel mixture in the supercharger path to progressively increase from about zero pounds per square inch gauge to about six pounds per square inch gauge as both a function of the position of lever 72 and the rotational speed of engine 10. Hence, a vehicle operator by simple manipulation of the accelerator pedal can smoothly transition from the naturally aspirated or unboosted mode of operation to a full boost mode of operation by progressively depressing the accelerator pedal or he can modulate the boost pressure at any partial amount needed for any particular driving situation. Further, since valving member 68 is resiliently moved from its first position to its second position, any abnormally high pressures in passage 56b, such as backfire pressures, will act on the unequal areas 68a and 68b and force valving member 68 towards its first position against the resilient force of spring 102. Hence, valving member 68 in combination with spring 102 provides the dual function of modulating boost pressure and the safety function of protecting against catastrophic failure due to engine backfire through the induction system.

The induction system as disclosed herein provides engine 10 with a relatively efficient naturally aspirated flow path for medium and low engine power settings, a smooth transition to and from the supercharger flow path, and when needed an almost instantaneous boost in supercharger pressure to its maximum boost (which herein by way of example is six pounds per square inch gauge) at relatively low engine speed. Further, since linkage assemblies 74 and 76 are connected in parallel from lever 72 to their respective valves, the amount of movement of the respective valves in response to a given amount of accelerator pedal movement may be readily varied independent of each other by merely varying the position of openings 72a, 72b, 72c, and 72d with respect to each other. Additionally, since the linkage assemblies are in parallel an optimum spring rate or rates may be selected to control valve 18 via linkage assembly 76 without affecting the operation of the throttle valves by linkage assembly 74. Hence, the linkage assemblies of linkage mechanism 44 may be readily adapted to fit a great variety of vehicles which in turn may have a variety of operating demands requiring a shift in the transition points between natural aspiration, partial supercharging, and full supercharging.

A preferred embodiment of the invention has been disclosed for illustrative purposes. Many variations and modifications of the preferred embodiment are believed to be within the spirit of the invention. For example, carburetor 12 could be provided with only primary throttle valves or a single throttle valve, in which case the system may transition to the supercharger path prior to or after the throttle valve or valves have fully opened. The following claims are intended to cover the inventive portions of the preferred embodiment and variations and modifications believed to be within the spirit of the invention.

What is claimed is:

1. An induction system adapted to supply air for combustion to an inlet of an expansible combustion chamber of an engine having a supercharger for boosting the pressure of the air, the system comprising:

a manifold assembly including first, second, third, and fourth air flow ducts converging into a central area, said first duct adapted to deliver aspirated air to said central area, said second duct adapted to deliver aspirated air from said central area to the supercharger, said third duct adapted to deliver boosted air from the supercharger to said central area, and said fourth duct adapted to deliver air from said central area to the inlet; and valve means including a valving member disposed in said central area and moveable between first and second positions, said valving member operative in said first position to divide said central area into first and second passages substantially blocked from intercommunication by said valving member, said first and second passages respectively communicating said first duct with said fourth duct and said third duct with said second duct, said valving member operative in said second position to divide said central area into third and fourth passages blocked from intercommunication by said valving member, and said third and fourth passages respectively communicating said first duct with said second duct and said third duct with said fourth duct.

2. The system of claim 1, wherein said valving member comprises:
a butterfly valving member.

3. The system of claim 1, wherein said valving member comprises:
a butterfly valving member having a surface area on one side of its pivotal axis greater than the other surface area.

4. The system of claim 1, 2, or 3, further including:
linkage means including means for resiliently moving said valving member from said first position to said second position.

5. In an engine of the type including an expansible combustion chamber having a combustion air inlet; power control means having means selectively moveable between minimum and maximum engine power positions; a supercharger to boost the pressure of the air; the improvement comprising:

a manifold assembly including first, second, third, and fourth air flow ducts converging into a central area, said first duct for delivering aspirated air to said central area, said second duct for delivering aspirated air from said central area to said supercharger, said third duct for delivering boosted air from said supercharger to said central area, and said fourth duct for delivering air from said central area to the inlet; and a valving member disposed in said central area and moveable between first and second positions, said valving member operative in said first position to divide said central area into first and second passages substantially blocked from intercommunication by said valving member, said first and second passages respectively communicating said first duct with said fourth duct and said third duct with said second duct, said valving member operative in said second position to divide said central area into third and fourth passages blocked from intercommunication by said valving member, and said third and fourth passages respectively communicating said first duct with said second duct and said third duct with said fourth duct.

6. The engine of claim 5, wherein said supercharger is of the type wherein the transfer of air between the supercharger inlet and outlet is at substantially constant pressure.

7. The engine of claim 5, wherein said supercharger is of the Roots type.

8. The engine of claim 5, 6, or 7, wherein said supercharger is mechanically driven by the engine.

9. In an engine including an expansible combustion chamber having a combustion air inlet; power control means having means selectively moveable between minimum and maximum engine power positions, a supercharger of the type which displaces air into a region of higher pressure at its outlet to effect a boost in the air pressure; the improvement comprising:

a manifold assembly including first, second, third, and fourth air flow ducts each converging at one end into a central area, said ducts respectively communicating at the other end with a source of air, the supercharger inlet, the supercharger outlet and the chamber; and valving means including a valving member disposed in said central area and moveable between first and second positions in response to movement of said selectively moveable means between said minimum and maximum positions respectively, said valving member operative in said first position to intercommunicate said first and fourth ducts and said second and third ducts via portions of said central area substantially blocked from intercommunication by said valving member, and said valving member operative in said second position to intercommunicate said first and second ducts and said third and fourth ducts via portions of said central area blocked from intercommunication by said valving member.

10. The engine of claim 9, wherein said power control means further includes;

linkage means interposed between said selectively moveable means and said valving member, said linkage means having means for resiliently moving said valving member from said first position to said second position in response to movement of said selectively moveable means from said minimum position to said maximum position.

11. The engine of claim 10, wherein said valving means further includes:

means responsive to air pressure in said ducts for biasing said valving member toward said first position counter to said resilient means.

12. The engine of claim 11, wherein said power control means further includes a throttle valve and second linkage means interposed between said selectively moveable means and said throttle valve, said second linkage means including:

means for resiliently moving said throttle valve from a substantially closed position to a substantially open position in response to movement of said selectively moveable means from said minimum position to an intermediate position.

13. The engine of claim 12, wherein said first mentioned resilient means moves said valving member sufficiently close to said second position to effect a slight pressure difference between said second and third ducts in response to movement of said selectively moveable means to said intermediate position and said first resilient means progressively moves said valving closer to said second position in response to movement of said selectively moveable means from said intermediate position toward said maximum position to effect a progressive increase in said pressure difference.

* * * * *